United States Patent
Marsh et al.

(10) Patent No.: US 9,632,000 B1
(45) Date of Patent: Apr. 25, 2017

(54) TRACK MEASUREMENT BY PHASE-BASED SIGNAL EXTRACTION

(71) Applicants: Andrew Wallace Marsh, Huntsville, AL (US); Bryant Paul Finney, Toney, AL (US); Stephen Cary Potts, Huntsville, AL (US); Benjamin Paul Leedy, Huntsville, AL (US)

(72) Inventors: Andrew Wallace Marsh, Huntsville, AL (US); Bryant Paul Finney, Toney, AL (US); Stephen Cary Potts, Huntsville, AL (US); Benjamin Paul Leedy, Huntsville, AL (US)

(73) Assignee: RMCI, Inc., Huntsville, AL (US)

( * ) Notice: Subject to any disclaimer, the term of this patent is extended or adjusted under 35 U.S.C. 154(b) by 52 days.

(21) Appl. No.: 14/607,069

(22) Filed: Jan. 27, 2015

Related U.S. Application Data

(60) Provisional application No. 61/931,859, filed on Jan. 27, 2014.

(51) Int. Cl.
   - G01B 11/14 (2006.01)
   - G01M 1/16 (2006.01)
   - G01B 11/26 (2006.01)

(52) U.S. Cl.
   CPC ............ G01M 1/16 (2013.01); G01B 11/26 (2013.01)

(58) Field of Classification Search
   CPC combination set(s) only.
   See application file for complete search history.

(56) References Cited

U.S. PATENT DOCUMENTS

| | | | |
|---|---|---|---|
| 2,552,739 A | 5/1951 | Roberts | |
| 2,960,908 A | 11/1960 | Mohan | |
| 2,964,849 A | 12/1960 | Roccati | |
| 3,012,468 A | 12/1961 | Hellen et al. | |
| 3,282,093 A | 11/1966 | Hans | |
| 3,316,759 A | 5/1967 | Hans | |
| 3,386,031 A | 5/1968 | Able et al. | |
| 3,515,485 A | 6/1970 | Frank | |
| 3,802,273 A | 4/1974 | Helmuth | |
| 3,856,410 A | 12/1974 | Millberger et al. | |

(Continued)

OTHER PUBLICATIONS

Johnson, Lloyd. "History: Helicopter Rotor Smoothing." Undated publication by Dynamic Solutions Systems, Inc., Vista, California. Retrieved from http://www.dssmicro.com/theory/dsrothst.htm on Jun. 4, 2014.

*Primary Examiner* — Tri T Ton

(57) ABSTRACT

An embodiment of a tracker system for determining the distance of a moving object from a predefined reference point is disclosed. The system uses a phase-based signal extraction technique for determining the traversal time of the object through a predefined angular region. The first embodiment of the system includes a weather-resistant enclosure (12), two photodiodes (21) with narrow fields of view, four light-emitting diodes pulsed at high frequencies (20), collimating optics (15) for use with the light-emitting diodes, focusing optics (14) for use with the photodiodes, and an analog circuit for signal extraction (FIG. 7). FIG. 2 shows each component in the first embodiment. Phase-based signal processing identifies time intervals over which the object is within the angular region, from which the distance to the object is calculated (FIG. 1). Alternative embodiments are also discussed.

22 Claims, 8 Drawing Sheets

(56) References Cited

U.S. PATENT DOCUMENTS

| | | |
|---|---|---|
| 4,049,644 A | 9/1977 | Wennerstrom |
| 4,465,367 A | 8/1984 | Sabatier |
| 4,531,408 A | 7/1985 | Chadwick |
| 4,604,526 A | 8/1986 | Moir |
| 4,727,258 A | 2/1988 | Tyssen |
| 4,766,323 A | 8/1988 | Franklin et al. |
| 4,812,643 A | 3/1989 | Talbot |
| 4,887,087 A | 12/1989 | Clearwater |
| 5,249,470 A | 10/1993 | Hadley |
| 5,671,051 A | 9/1997 | Wright |
| 5,835,199 A * | 11/1998 | Phillips ................ G01S 7/4802 356/28.5 |
| 5,929,431 A | 7/1999 | Hadley |
| 6,448,924 B1 | 9/2002 | Hafer |
| 8,126,254 B2 | 2/2012 | Lasa |
| 8,190,393 B2 | 5/2012 | Moir |

\* cited by examiner

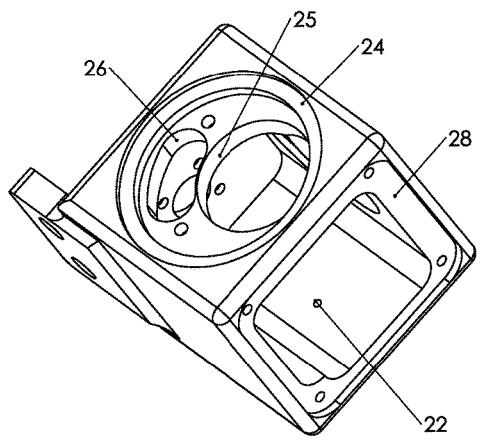
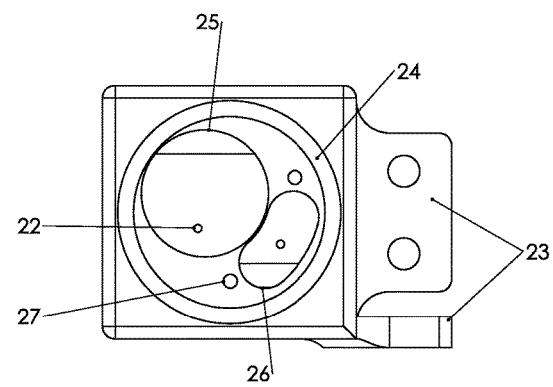
FIG. 3A  FIG. 3B
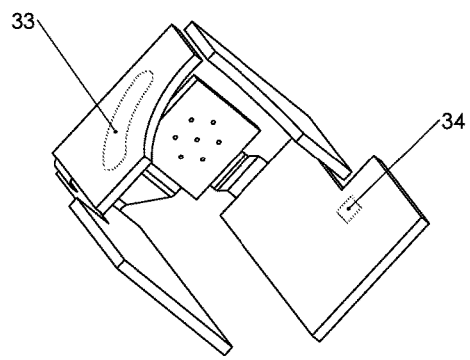
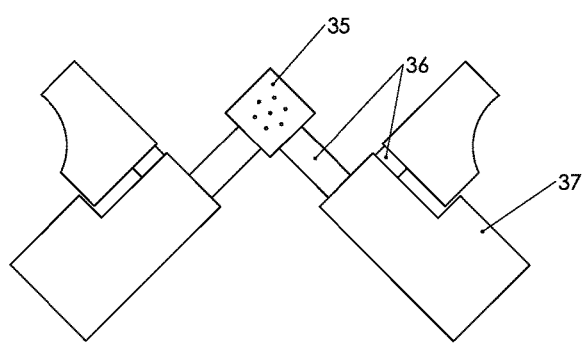
FIG. 4A  FIG. 4B

TRACK MEASUREMENT BY PHASE-BASED SIGNAL EXTRACTION

CROSS-REFERENCE TO RELATED APPLICATIONS

This application claims the benefit of U.S. provisional patent application Ser. No. 61/931,859, filed Jan. 27, 2014.

BACKGROUND AND PRIOR ART

The following patents appear to be relevant prior art:

| Pat. No. | Kind Code | Issue Date | Patentee |
|---|---|---|---|
| U.S. Pat. No. 6,448,924 | B1 | 2002 Sep. 10 | Hafer |
| U.S. Pat. No. 5,929,431 | A | 1999 Jul. 27 | Hadley |
| U.S. Pat. No. 5,671,051 | A | 1997 Sep. 23 | Wright |
| U.S. Pat. No. 5,249,470 | A | 1993 Oct. 5 | Hadley and Cheeseman |
| EP0089228 | B1 | 1991 Apr. 9 | Moir and Clearwater |
| U.S. Pat. No. 4,812,643 | A | 1989 Mar. 14 | Talbot |
| U.S. Pat. No. 4,766,323 | A | 1988 Aug. 23 | Franklin et al. |
| U.S. Pat. No. 4,531,408 | A | 1985 Jul. 30 | Chadwick and Johnson |
| U.S. Pat. No. 4,465,367 | A | 1984 Aug. 14 | Sabatier |
| U.S. Pat. No. 3,802,273 | A | 1974 Apr. 9 | Helmuth and Chadwick |
| U.S. Pat. No. 3,515,485 | A | 1970 Jun. 2 | Frank |
| U.S. Pat. No. 3,386,031 | A | 1968 May 28 | Able et al. |
| U.S. Pat. No. 2,964,849 | A | 1960 Dec. 20 | Roccati |
| U.S. Pat. No. 2,552,739 | A | 1951 May 15 | Roberts |

Rotor Track and Balance (RTB) is an important maintenance procedure recommended for all helicopters. Due to manufacturing tolerances and other variations between blades, certain maintenance adjustments should be made periodically in order to reduce track split and to properly balance the helicopter rotor system, correcting for mass distribution variations.

One common component of most RTB systems is the tracker, which is used to detect blade track height so that maintainers can correct track height and perform balancing. Tracker systems are well known in the prior art; various methods have been in use for decades, with techniques ranging from touching the blades with a marker, to using much more advanced optical systems. Although many different technologies exist in the prior art for helicopter rotor blade tracking, optical systems will remain the focus of this discussion.

Many optical systems use the principle of a conical view window to calculate blade track height: due to the difference in height between blades, blades following a higher flight path take longer to traverse an angular region defined by the field(s) of view of the system, and thus it remains in view for a longer period of time. By analyzing the times over which each blade is within the angular region, the height of the blade can be calculated and the proper maintenance adjustment can be recommended in order to correct the track split.

There are several systems currently in use for performing track calculation; however, they are plagued by several recurring issues that often lead to frustration and expense on the part of the maintainers and operators. One such issue is environmental sensitivity: most systems are passive, utilizing scattered background radiation from the sky by detecting the intensity drop as each blade passes through the field of view of the system. The use of a passive system is intuitive to many in the field due to the brightness of the background radiation; however, inherent to these designs is a reliance on environmental conditions in order for the system to function properly. In poor weather conditions, these systems are reported to experience poor functionality, often forcing maintainers to resort to strange workarounds, such as attempting to operate the trackers in night mode during the day.

Systems that include an illuminator to emit radiation towards the blades typically utilize the illuminator for night mode operation only, as the systems are unable to differentiate between the background radiation and emitted radiation. In addition, the use of a retroreflective material attached to the helicopter blades is often required; the installation and removal of these materials is not only an annoyance, but increases maintenance costs and downtime of the helicopter.

SUMMARY

This disclosed tracker system is a solution to the long-standing RTB issues experienced by other systems. Instead of relying on background radiation, the system uses an illuminator that emits radiation towards the blades during both day and night use (thus, the system is able to operate with a single mode of operation). The use of advanced signal processing techniques allows the system to detect the emitted radiation and perform rotor track height measurements independent of environmental conditions.

The disclosed system consists of one or more emitters and one or more sensors. The emitters are pulsed at a high frequency, facilitating the use of a lock-in amplifier circuit that allows detection of the emitted light at signal-to-noise ratios that would be too low for other systems.

For many applications, the tracker does not require the use of retroreflective tape. This, along with several weather-proofing techniques and size/weight reduction features, allows the tracker to be installed permanently on the exterior of the aircraft and used during normal flight operations rather than only during dedicated maintenance operations.

Implementation of the system involves integration of the following components:
 One or more emitters that emit electromagnetic radiation
 One or more sensors that detect the emitted radiation
 The ability to pulse the emitters at high frequencies
 A signal conditioning method that uses phase-locked background subtraction to extract a useful signal from the detectors In addition, a controller/data collector is implemented for recommending maintenance adjustments based on the return signal from the disclosed tracker unit. One example of such a controller is an onboard Health and Usage Monitoring System (HUMS) that takes track height acquisitions automatically based upon regime recognition, and then periodically recommends maintenance adjustments on an as-needed basis.

Advantages

The disclosed tracker system contains the following advantages over the prior art:
1) The need for reflective tape is reduced.
2) Only a single mode is used for both day and night operation.
3) The disclosed system maintains consistent performance in most environmental conditions.
4) Operation is hands-free and does not require interaction with the pilot.
5) Maintenance costs are reduced due to the following features of the disclosed tracker system:

a) Setup time for RTB procedures is significantly reduced because the system can be permanently installed
b) The need for dedicated rotor track and balance flights is decreased due to automatic RTB acquisitions and permanent installation
c) The system can be implemented in such a way that the total cost is lower than the price of other trackers

DRAWINGS

Related figures are labeled with the same number followed by a letter.

FIG. 3A and FIG. 3B show a base enclosure in detail, and specific features of the enclosure are identified in these figures.

FIG. 4A and FIG. 4B show a physical configuration of the circuit board used for mounting the emitters, photodetectors, and feature extraction circuit.

Figure 1:
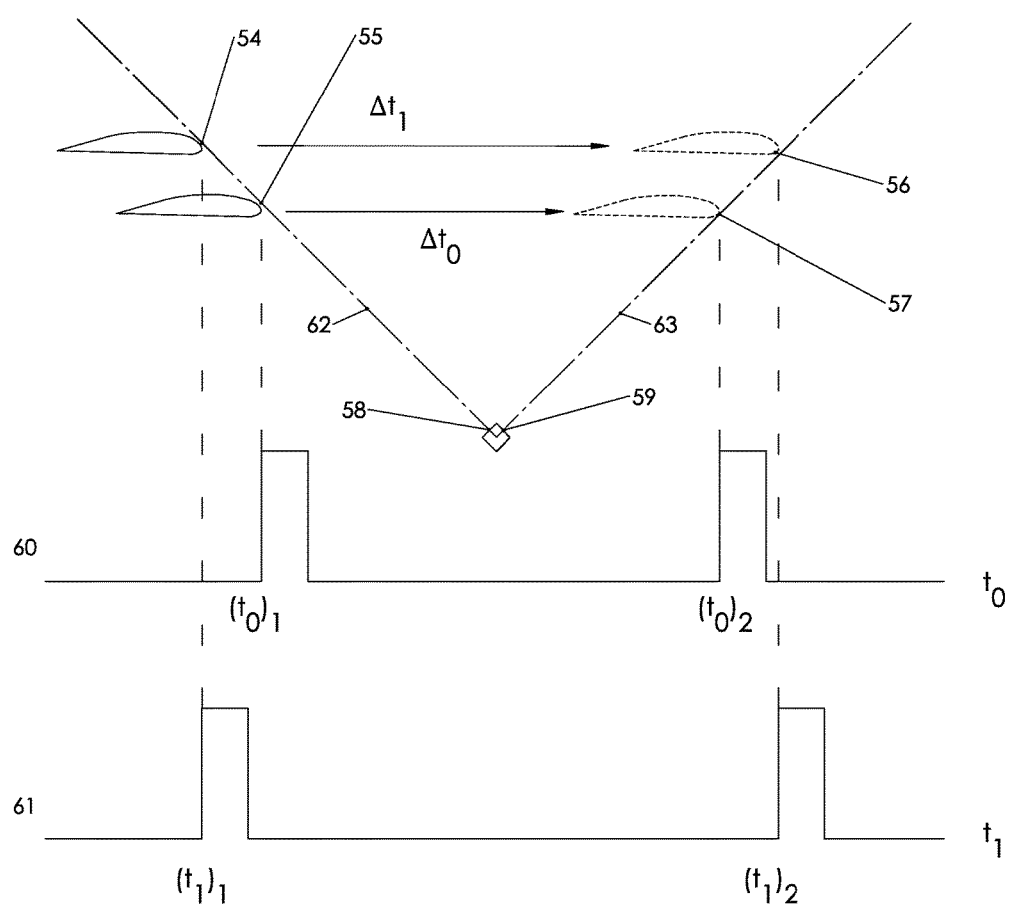
FIG. 1 is a diagram illustrating the mathematical principle upon which the system is based

| REFERENCE NUMERALS | |
|---|---|
| 12 | Enclosure |
| 13 | Protective Window |
| 14 | Focusing Optic |
| 15 | Collimating Optic |
| 16 | Front Access Cover |
| 17 | Positioning Spacer |
| 18 | Circuit Board |
| 19 | Water-tight Connector |
| 20 | Electromagnetic Radiation Source |
| 21 | Photodetector |
| 22 | Press-fit Pin |
| 23 | Mounting Flange |
| 24 | Window Mounting Surface |
| 25 | Focusing Optic Cutout |
| 26 | Collimating Optic Cutout |
| 27 | Collimating Optic Mounting Holes |
| 28 | Front Access Cover Mating Surface |
| 33 | Emitter Mount Location |
| 34 | Photodetector Mount Location |
| 35 | Panel Connector Mount Location |
| 36 | Flexible Circuit Board |
| 37 | Rigid Circuit Board |
| 39 | Percentage of View Filled by Object |
| 40 | PWM Input |
| 41 | Photodetector Current |
| 42 | Integrator Voltage |
| 43 | Output Signal |
| 47 | Emitter Optical Axes |

-continued

| REFERENCE NUMERALS | |
|---|---|
| 48 | Optical Surface |
| 49 | Mounting Peg |
| 54, 54' | Blade 1 Time 1 |
| 55, 55' | Blade 0 Time 1 |
| 56, 56' | Blade 1 Time 2 |
| 57, 57' | Blade 0 Time 2 |
| 58, 58' | Sensor 1 |
| 59 | Sensor 2 |
| 60, 60' | Output Signal from Blade 0 |
| 61, 61' | Output Signal from Blade 1 |
| 62 | Emitter/Sensor 1 Optical Axis |
| 63 | Emitter/Sensor 2 Optical Axis |
| 66 | PWM Input |
| 67 | Emitter Driver |
| 69 | Object of Interest |
| 71 | Transimpedance Amplifier |
| 72 | Inverter |
| 73 | Gate Control |
| 74 | Low-Pass Filter |
| 75 | Voltage-Current Converter |
| 76 | Integrator |
| 77 | Hysteresis Comparator |
| 78 | Output to Data Collector |
| 83 | System Mounted |
| 84 | Regime Detection Triggers Collection |
| 85 | Data Processed to Calculate Track Height |
| 86 | Maintenance Adjustments Recommended |
| 162 | Side 1 of field of view of single sensor |
| 163 | Side 2 of field of view of single sensor |

DETAILED DESCRIPTION

First Embodiment

The first embodiment of the disclosed tracker is used for the determination of helicopter rotor blade track height. The primary components of the system are enclosed in a single unit that is mounted to the exterior of the aircraft. The unit is mounted either permanently or temporarily, according to the preference of the end user. For permanent mounting, weatherproofing of the enclosure is advisable; several potential weatherproofing design features are utilized by this first embodiment and are discussed in detail below. Additionally, it is helpful for the unit to be as small and lightweight as possible; this first embodiment also incorporates several design features that reduce space and weight. The system of the first embodiment is not designed to be used standalone—rather, it interfaces with a data collection system which performs signal processing and determines when measurements are to be taken. However, a standalone system remains within the scope of this patent, as it is within the ability of one skilled in the relevant art to modify the existing design to be used without an external data collection system.

FIG. 1 illustrates the mathematical principles upon which the system is founded. In the first embodiment, the first optical axis 62 defines the narrow field of view of the first sensor 58, and the second optical axis 63 defines the narrow field of view of the second sensor 59. These two fields of view define an angular region shaped like a triangle extending upward. Two example blades are shown at two different points in time. The first blade crosses the optical axis 62 of the first sensor 58 at point 54 and the optical axis 63 of the second sensor 59 at point 56, and it is out of track. The second blade crosses the optical axis 62 of the first sensor 58 at point 55 and the optical axis 63 of the second sensor 59 at point 57, and it is in track. The time difference between pulses in the output signal from the first blade 60 and the output signal from the second blade 61 is processed to estimate track height. One of several simple algorithms can be implemented for processing the output signal. Blades are identified based upon a tachometer signal on the helicopter main rotor shaft.

In the first embodiment, an external data collector calculates the time difference between pulses, from which it is then able to calculate distance to the rotor blade. The data collector of the first embodiment is a HUMS; the disclosed tracker unit is a component of the HUMS which enables the HUMS to be used for RTB procedures by enabling track height measurement. The HUMS in the first embodiment consists of an embedded computer system with interfaces for sending the Pulse-Width Modulation (PWM) signal to the disclosed tracker unit for driving the emitters, and interfaces for receiving the output square waves from each sensor in the tracker system. The HUMS calculates track height and recommends maintenance adjustments as outlined in the Operation section below.

Figure 2:
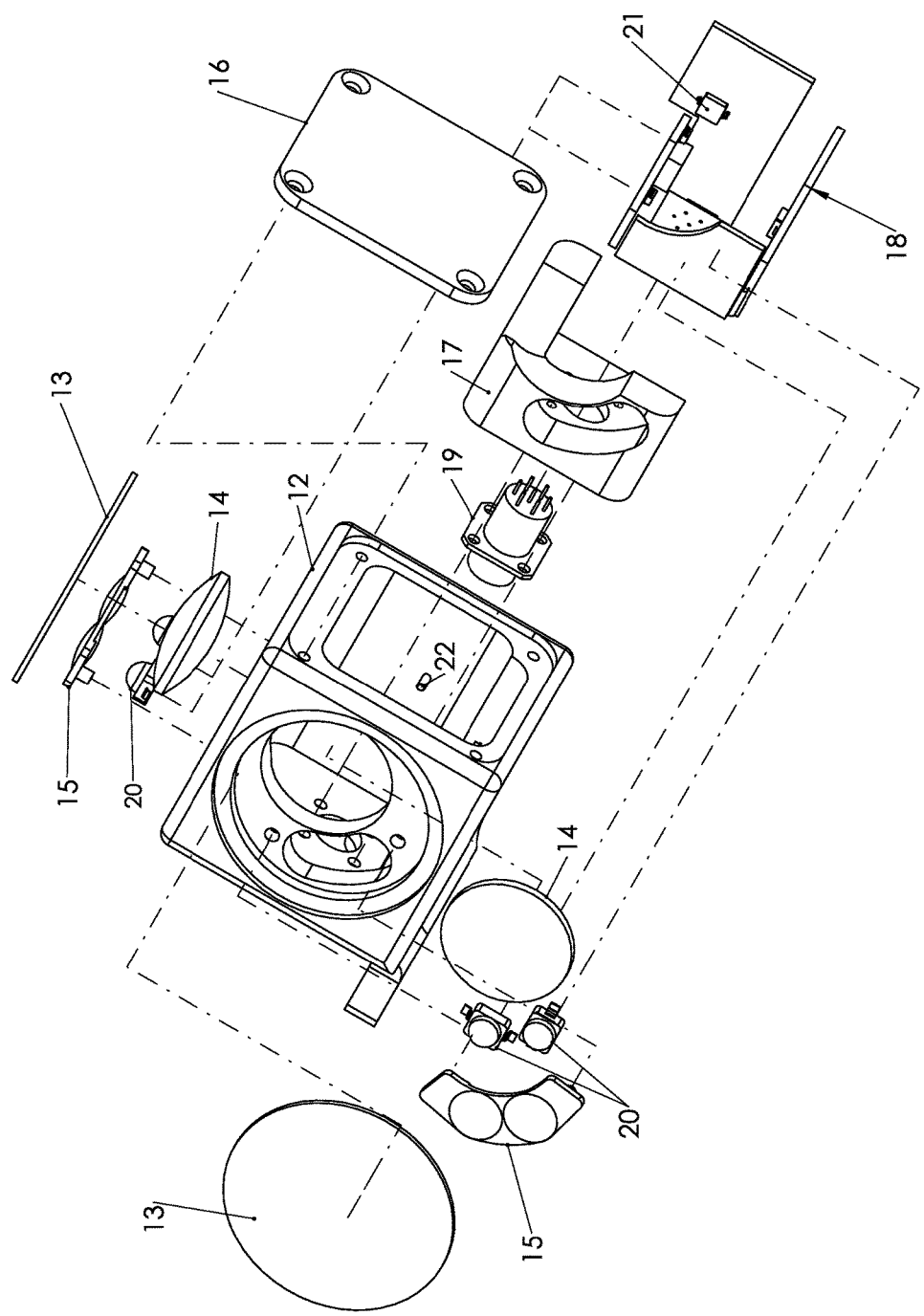
FIG. 2 shows an exploded view of an entire system, including all of the primary components of which it consists
Figure 6:
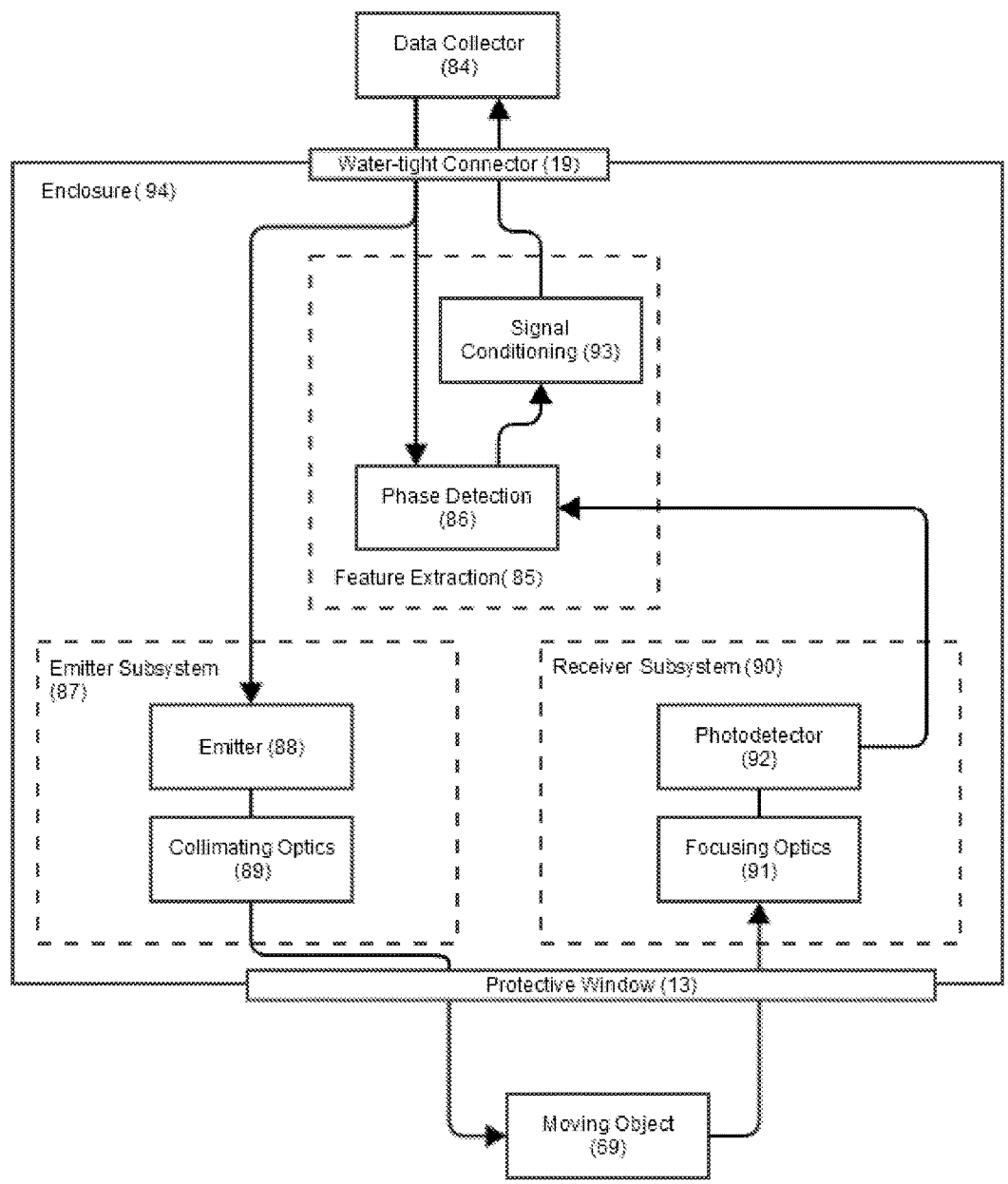
FIG. 6 is a functional block diagram showing major subsystems and components of the disclosed tracker system with particular emphasis on the interconnections between them.

The system of the first embodiment consists of three main subsystems: 1) the emitter subsystem, 2) the receiver subsystem, and 3) the feature extraction subsystem. The breakdown of subsystems and their interfaces are illustrated in FIG. 6. Additionally, an exploded view of the entire system of the first embodiment is shown in FIG. 2: in this embodiment, the emitter subsystem components include a protective window 13, a collimating optic 15, a positioning spacer 17, and an electromagnetic radiation source 20; the receiver subsystem components include the protective window 13, a focusing optic 14, and a photodetector 21; and the feature extraction subsystem components include the positioning spacer 17, a circuit board 18, and a water-tight connector 19.

Emitter Subsystem

The emitter subsystem is responsible for illuminating the moving object with electromagnetic radiation. The subsystem is capable of being switched from an "on" state to an "off" state very rapidly in order to utilize the lock-in amplifier circuit (see the Feature Extraction Subsystem description for details on the circuit). The "on" state is defined as a state in which the emitter is illuminating the object of interest, and the "off" state is defined as a state in which the emitter is not illuminating the object of interest. In the first embodiment, four Light-Emitting Diodes (LEDs) 20 are used to produce the electromagnetic radiation; the "on" and "off" states are created by supplying power in high-frequency pulses. The LEDs emit in the near-infrared region of the electromagnetic spectrum and thus are not detectable by the human eye. Additionally, an emission wavelength is used that aligns with the absorption spectrum of the earth's atmosphere in order to reduce influence from sunlight.

The LEDs are mounted on the circuit board 18, which provides power, positions the diodes in the appropriate locations for collimating their emissions, and acts as a heat sink for thermal management. The first embodiment utilizes a rigid-flex Printed Circuit Board (PCB) in order to reduce the space used by the circuit; FIG. 4 shows flex points 36 used to attach a panel connector mount 35 to the rigid circuit board regions containing a mount location 33 and a main rigid circuit board region 37.

Figures 5A, 5B:
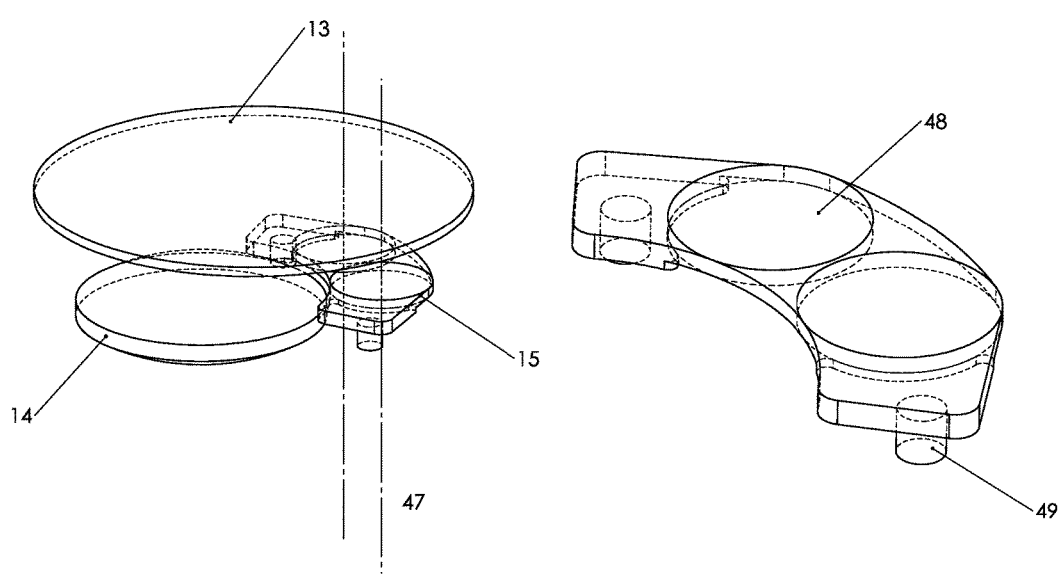
FIG. 5A shows all of the optical elements of a system and their relative positioning.
FIG. 5B shows the emitter optic in detail

The custom injection-molded plastic optic 15 is used for collimating the emitters. The optic is shown in detail in FIG. 5B and is shown in context of the other optical components in FIG. 5A. It is designed to focus as much of the light from the emitter to as small of an area as reasonably practicable. The optic mates with the enclosure at mounting holes 27 through the use of pegs 49 that are molded as part of the optic. In the first embodiment, the custom optic contains four optical surfaces 48, each of which is convex. The emitters are collimated by these optical surfaces. Polycarbonate is the material of choice for this custom optic, but any of a variety of materials may be used if desired.

The spacer 17 of predetermined dimensions slides into place with all circuit components attached. The spacer, in conjunction with the circuit board 18, is responsible for positioning the LEDs 20 at predetermined locations such that their emissions are collimated by the custom optic 15 to the extent reasonably practicable. Optical axes 47 of the collimating optic 15 align with the optical axes of the emitters 20.

The protective window 13, which is the final component of the emitter subsystem, is also included in the receiver subsystem and is discussed in that section.

The emitter subsystem contains the following interfaces:
1) Mechanical interface with the enclosure
   a) The optics are mounted with a waterproof epoxy in order to provide a complete seal from the environment.
2) Electrical interface with data collector
   a) In practice, the first embodiment incorporates the emitters onto the same board as the feature extraction circuit.
3) Optical interface with object and receiver subsystem
   a) Reflected emissions are measured by the receiver subsystem. The first embodiment does not require the use of a retroreflective material on the surface of the object of interest (depending on application); however, such may be used if desired in order to increase performance in extreme conditions.

Receiver Subsystem

The receiver subsystem is responsible for detecting the pulsed radiation from the emitter subsystem. The photodiode 21 is sensitive at the spectrum over which the emitters operate. The photodiode is positioned at a predefined location 34 such that—when coupled with the focusing optic 14—light received from the emitter is spread over the entire detecting surface. The area of the exposed surface limits the field of view of the sensor, reducing the amount of incident light from sources other than the object of interest. The first embodiment does not use an additional aperture stop to reduce the field of view, but such could be used depending on certain implementation-specific factors.

As with optic 15, the focusing optic is made from injection-molded polycarbonate. The focal length of the optic is set so that, based on the size of the photodiode, the field of view is limited to be just larger than the area over which the light from the emitter is spread. A smaller field of view reduces the influence of light from objects other than the object of interest.

The protective window 13 acts as a barrier between the external environment and the optics within the enclosure. A separate window from the other optical components is used in order to reduce the number of potential leak points in the enclosure by reducing the number of sealant interfaces. The window in the first embodiment is made from grown sapphire, which has properties that make it suitable for enduring harsh environments.

Additionally, the first embodiment incorporates a bandpass filter which allows emitted light to pass while blocking light of other wavelengths. A coating is applied to the inside of the window 13 to achieve this effect.

The receiver subsystem contains the following interfaces:
1) Mechanical interface with the enclosure
   a) The optics are mounted with a waterproof epoxy in order to provide a complete seal from the environment.
2) Electrical interface with feature extraction circuit
   a) As with the emitters, the first embodiment incorporates the photodiodes onto the same board as the feature extraction circuit.
3) Optical interface with object and emitter subsystem
   a) Incoming emissions are produced by the emitter subsystem. The first embodiment does not require the use of a retroreflective material on the surface of the object of interest (depending on application); however, such may be used to increase performance in extreme conditions.

Feature Extraction Subsystem

Figure 7:
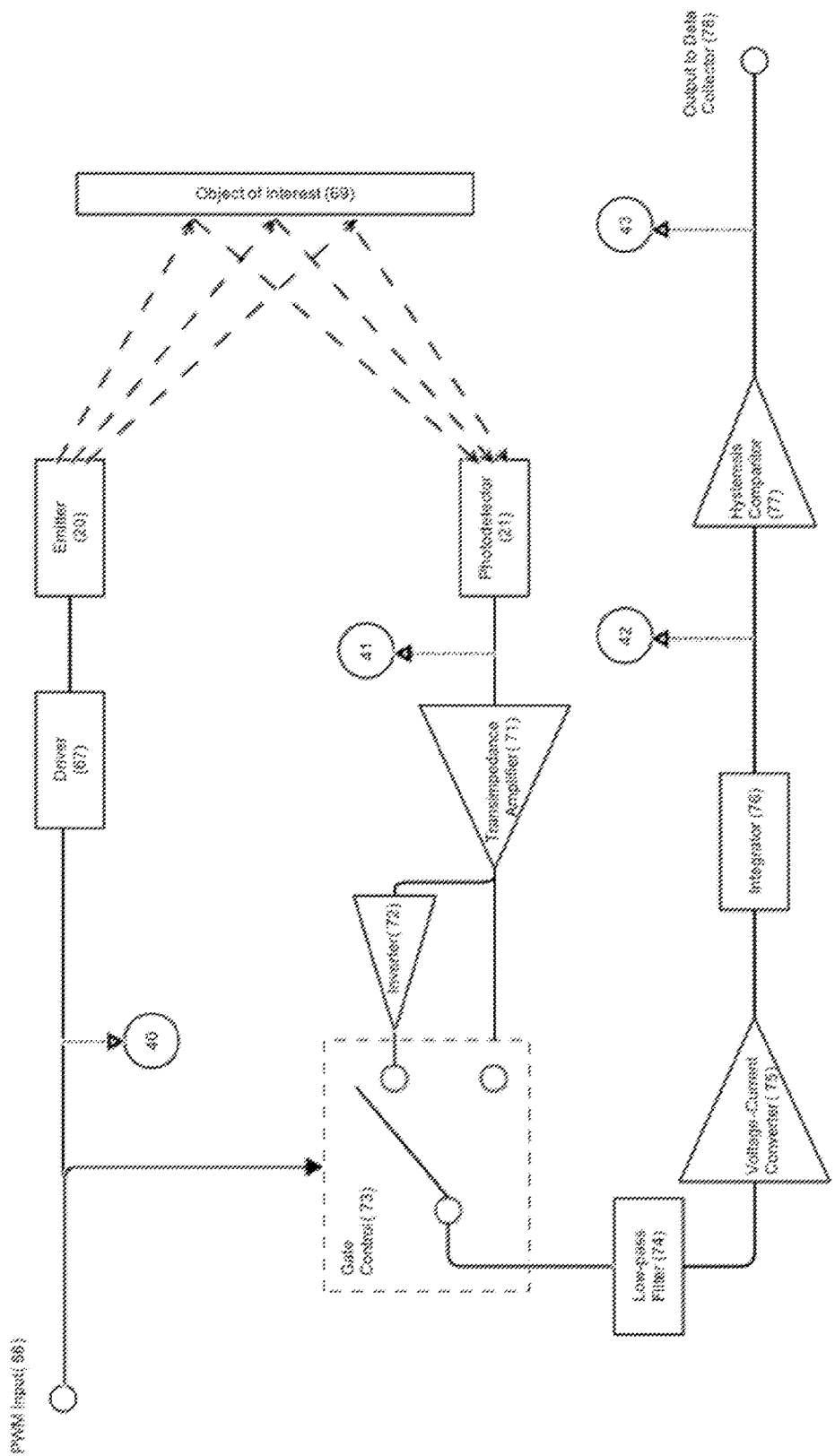
FIG. 7 is a circuit diagram depicting each of the major electrical components used by the emitters, photodetectors, and feature extraction circuit.

The feature extraction subsystem is responsible for separating the return signal generated by the emitter subsystem after it is reflected off a given object of interest 69 from the background noise present on the receiver subsystem; FIG. 7 shows a block diagram of the electronics comprising the subsystem in the first embodiment. The emitters are powered by a driver 67 that is controlled by a reference PWM signal 66. A transimpedance amplifier 71 is used to convert the current passing through the photodiode 21 into a usable voltage. The output of the transimpedance amplifier is fed into a phase sensitive detector. The PWM signal used to drive the emitter subsystem is also used as the reference signal for a gate control 73 portion of the phase sensitive detector. The gate portion of the phase sensitive detector passes the output of the transimpedance amplifier while the PWM signal is high and inverts the output of the transimpedance amplifier 72 when the PWM signal is low. The output is amplified and a low-pass filter 74 is applied. As a result, signals that are in phase appear as a DC voltage at the output of the phase detection circuit. Out of phase background noise is averaged out to zero over time. The phase detection circuit drives a voltage-to-current converter 75. The voltage-to-current converter is used to generate a drive current that is a fixed multiple of the current detected by the photodiode. The drive current charges a passive RC integrator 76. Predefined resistance and capacitance values are used in the integrator that optimize the charge and discharge rates based on the expected photodiode current. The voltage across the integrator is fed to a comparator 77 to convert the analog signal into a digital waveform that indicates when a blade has been detected. Hysteresis is added to the comparator to reduce sensitivity to noise. The hysteresis thresholds of the comparator circuit define the edges of the square wave output 43 which is processed to determine blade track height. The time between leading edges of the square wave output signal is a direct measurement of blade's transit time across the angular region as shown in FIG. 1. The PWM drive signal 66 and blade detection signal 78 are routed through the waterproof connector 19 back to the external data collection module 84. The mathematical conversion from the measured blade transit time to blade track occurs in the data collection module.

Figure 8:
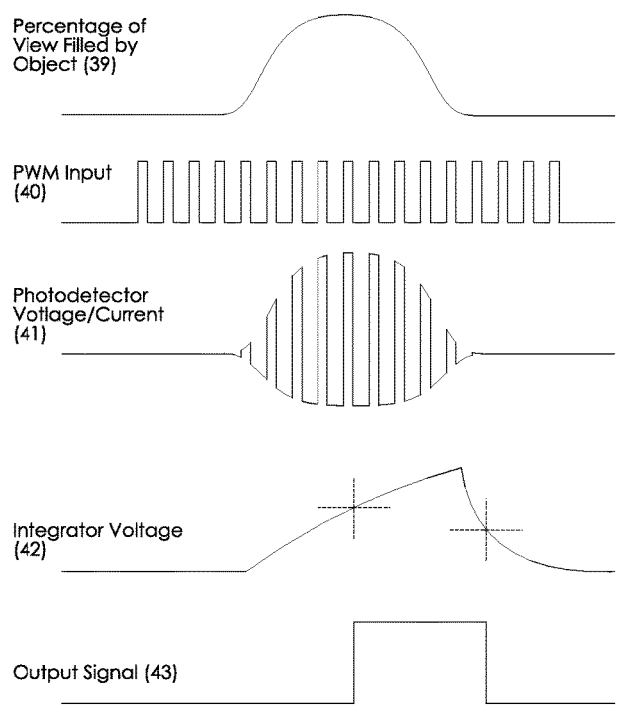
FIG. 8 shows a signal as measured at the points labeled in the circuit diagram, FIG. 7.

FIG. 8 shows sample signals measured at several points along the feature extraction circuit (FIG. 7). As the object of interest crosses the view window of the photodetectors (shown as a fraction 39), the input PWM signal 40 is triggered at a predefined region around where the blade is expected to intersect the optical axis of the receiver based upon a tachometer reading. The current through the photodetector 41 increases as the reflected irradiance from the helicopter blade 69 increases. The integrator is used to convert the PWM signal into a DC voltage: the voltage across the integrator 42 slopes upward as the blade crosses the view window, then drifts back to zero after it leaves. Predefined threshold points set by the hysteresis comparator 77 define the edges of the output square wave 43, which is processed to determine blade track height.

Enclosure

An enclosure 12 is designed to provide weather resistance, electromagnetic shielding, and mounting interfaces for each of the components included within. A front access cover 16 is removable in order to allow inspection and repair of internal components; a mating surface 28 includes a groove for O-ring installation. The enclosure mates with the circuit board 18 through the use of press-fit pins 22 located on the lower interior walls. The focusing optic 14 slides into a cutout 25, and the collimating optic 15 slides into another cutout 26, and both optics are fixed through the use of aerospace grade epoxy. After the optics are placed, the protective window 13 mounts at a mounting surface 24 with epoxy to form a waterproof seal. The protective window prevents damage to the optics inside; additionally, its positioning as the outermost element in the optics stack reduces the number sealing interfaces with the enclosure that are exposed to the environment, decreasing the potential for leaks.

The connection to the external data collector is made through the use of the water-tight connector 19, which is attached to the electrical components through the panel connector mount 35. The entire system is mounted to the exterior of a helicopter via mounting flanges 23 on the back of the enclosure.

OPERATION

First Embodiment

Figure 9:
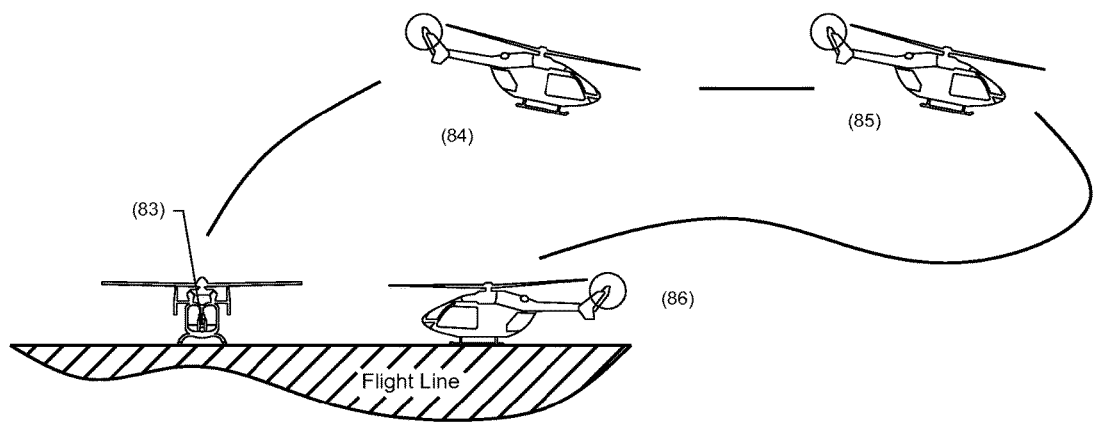
FIG. 9 is an operational diagram that shows the operation the first embodiment.

FIG. 9 shows a summary of one method of operation for the first embodiment. The system is designed to support permanent mounting on the outside of a helicopter 83. When incorporated with a controller/data collector, automatic acquisitions can be made based upon flight regime 84, after which the data is processed. When coupled with automatic unbalance calculation, maintenance adjustments can be recommended 86 on an as-needed basis, reducing the need for dedicated rotor track and balance flights. The controller supplies power to the system and supplies the input signal for the emitters. The controller also accepts the output signal from the system and performs digital or analog processing in order to calculate track height from the time difference between the peaks detected from the separate photodetectors (see FIG. 1).

When the controller supplies a PWM input signal 40, the emitters 20 transmit electromagnetic radiation in a pattern that replicates the input signal. The electromagnetic radiation is directed towards the moving object and reflected back to the disclosed tracker. The feature extraction circuit then reduces the signal to an on/off pulse indicating when the object is in view of the sensor. In the first embodiment, the output signals from each of the two sensor circuits are returned to the data collector for analysis.

In the first embodiment, the data collector finds the time difference between corresponding sensor pulses. At installation, a predefined curve-fitting regression technique is used with calibration to identify the appropriate relationship between time difference and blade track height. Once the times when the object entered and exited the angular region are known, it is simple to calculate the distance to the blade based on its speed and the geometry of the angular region. In the first embodiment, the HUMS already measures the angular speed of the blade using a tachometer attached to the rotor shaft or attached to another shaft that is connected to the main rotor shaft via gearing.

Once the track height of each blade is known, maintenance adjustments can be made to the blades while the helicopter is not in use in order to reduce the track split of the helicopter. Methods for reducing track split once current track height is known are well established in the prior art (e.g., U.S. Pat. No. 2,552,739, U.S. Pat. No. 3,515,485, U.S. Pat. No. 3,802,273).

DETAILED DESCRIPTION

Alternate Embodiments

Several modifications to the disclosed can be made without departing from the spirit of the invention. One such alternate embodiment replicates the feature extraction functionality digitally instead of using analog circuitry. This approach relies on dedicated Digital-Signal Processing (DSP) hardware to implement both the input signal phase shift and the low pass filter. The comparator with its hysteresis function that generates the output square wave can be duplicated in software. Benefits of using a digital approach include a reduction of potential error sources such as mismatches in component tolerance, offset voltages in operational amplifiers, and temperature drift.

Figure 10:
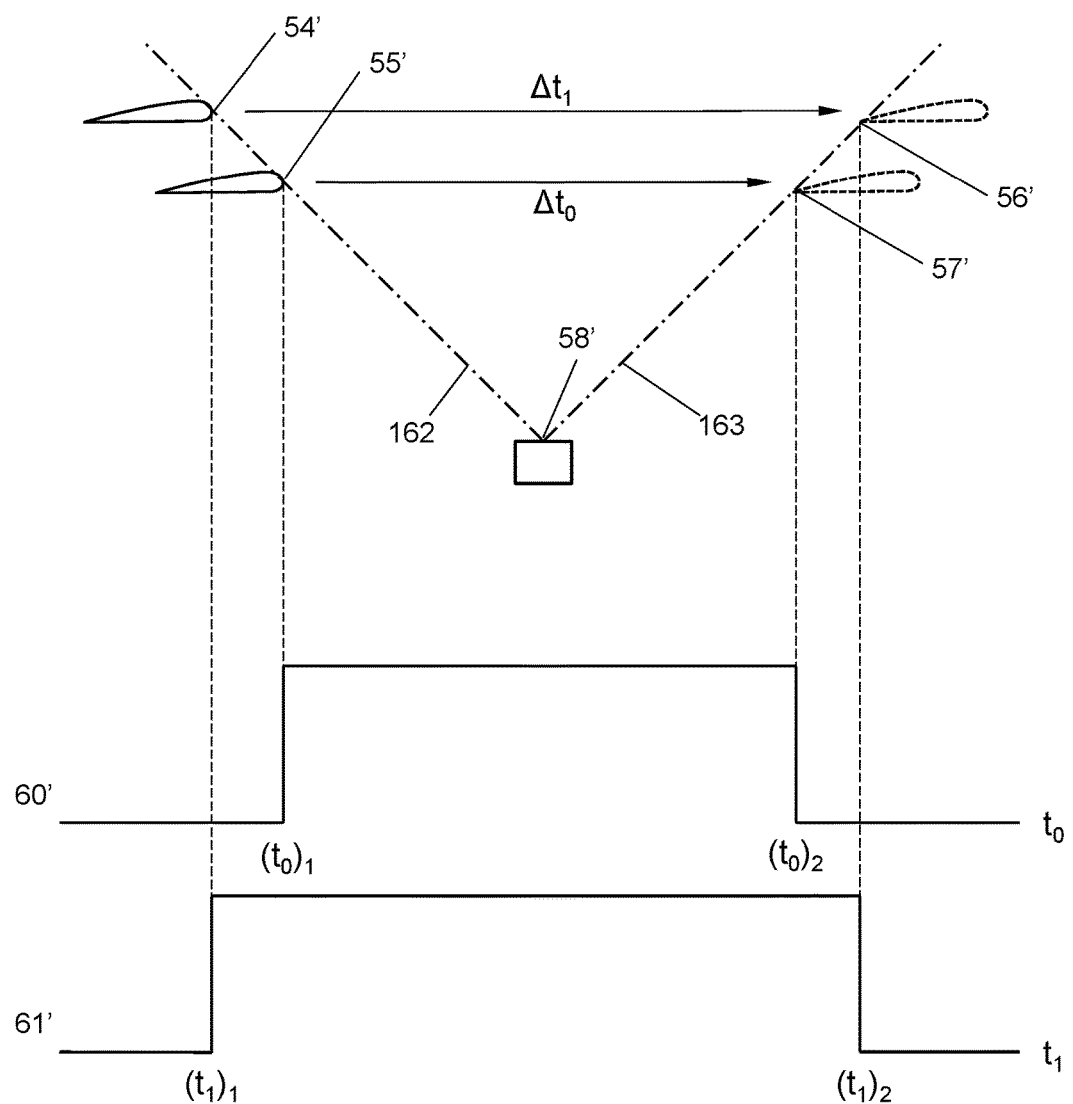
FIG. 10 is a diagram illustrating the mathematical principle as implemented with an alternative embodiment using one sensor.

As previously mentioned and as shown in FIG. 10, one sensor 58' may be used instead of two, or more than two sensors may be used in order to reduce error. The same mathematical principles upon which the first embodiment rely are utilized by both of these cases. If one uses a single sensor 58' with a single field of view, then the field of view should be wider so that its sides 162 163 are not substantially parallel. The trigger times will be points 54' 55' when the blade enters the field of view and points 56' 57' when it leaves the field of view rather than the points when it crosses each of two or more fields of view. Other than that, the processing and calculation of distance are the same.

The first embodiment uses emitters that operate in the near-infrared, at a wavelength aligning with the atmospheric absorption spectrum; however, other emission and reception bands could be used. Systems utilizing ultraviolet radiation, visible light, longer-wavelength infrared, and other bands in the electromagnetic spectrum are all feasible with minimal modification. Each band has different benefits and detriments, and the end use of the system determines which wavelength is most effective.

OPERATION

Alternate Embodiments

Various techniques are possible to calculate distance to the object based on the time difference between when the object enters and exits the angular region. The speed and length of the path that the object traverses can be linear or angular without substantially impacting the nature of the calculations.

CONCLUSIONS, RAMIFICATIONS, AND SCOPE

The disclosed tracker system, including the various embodiments of such, provides a solution to the environmental sensitivity issues inherent in many previous optical tracker designs. Further, the nature of the disclosed embodiments allows additional reduction of maintenance costs by effectively supporting permanent mounting and automatic RTB analysis. Although many tracker systems are well known in the prior art, the advantages of this new system are numerous and significant.

While the above description identifies several embodiments of the disclosed system, it shall be understood that such embodiments are not limitations of the scope of this disclosure. The nature of the disclosed system is such that numerous methods can readily be identified for implementing the design, and the details of the implementation will vary based upon the specific application and the preference of the end user. The embodiments described previously, as well as other implementation-specific design alternatives such as the following all provide a variety of permutations which fulfill different criteria as desired:

- enclosure arrangement, material choice, and manufacturing method
- signal processing algorithm selection
- optical component configuration, placement, and interfacing
- circuit layout and design
- use, application, and purpose Each of these alternatives shall be understood to exemplify the nature of the disclosed invention, but many more ramifications exist for which the disclosed is capable to achieve.

Thus, the scope shall be determined by the following claims and their legal implications, and it shall not be based solely upon the embodiments described above. Although useful for exemplifying specific applications of this system, the above description is does not reflect every ramification or implementation of the disclosed; rather, the following claims define the nature of the invention and shall be used for identifying potential embodiments of such.

| Term | Definition |
| --- | --- |
| | Definitions of Terms |
| RTB—Rotor Track and Balance | The process of performing maintenance adjustments to correct for mass and aerodynamic variations between helicopter blades in order to reduce vibrations |
| PWM—Pulse-Width Modulation | A method of controlling power to a circuit component by switching a source voltage between "on" and "off" positions. When the ratio of "on" duration to "off" duration increases, the power supplied increases |
| LED—Light Emitting Diode | A circuit component used for the emission of electromagnetic radiation |
| HUMS—Health and Usage Monitoring System | A system that monitors the condition of important dynamic or structural components in a vehicle, often through vibration analysis |
| PCB—Printed Circuit Board | A substrate (typically silicon) onto which circuit components are mounted and connected through the use of conductive traces |
| Angular Region | A region in space substantially shaped like a cone, triangle, or other shape with at least two edges that are not parallel |
| Track | The path of a moving object |
| Track Split | A property of helicopter rotors characterized by differing paths of travel between rotor blades, caused by aerodynamic differences in the blades |
| Lock-in Amplifier | A type of amplifier capable of extracting a usable signal even when large amounts of noise are present. |
| Flight Regime | A flight state of predefined inertial and stability characteristics, e.g. hover, forward flight, transition, etc. |
| Regime | A process of automatically determining flight regime |

-continued

Definitions of Terms

| Term | Definition |
| --- | --- |
| Recognition | based upon analysis of flight data parameters |
| Object of Interest | A moving object probed by a tracker system for the purposes of locating the distance of the object from the tracker. In the case of the first embodiment, the object of interest is a rotor blade |
| Unbalance | A mass variation in a dynamic system that causes vibrations |
| DSP—Digital Signal Processing | A signal processing technique which utilizes digital hardware to perform the processing |

We claim:

1. A system for measuring the distance to the path of a moving object, comprising:
    a) at least one emitter that emits electromagnetic radiation,
    b) at least one sensor that senses said electromagnetic radiation,
    c) an electronic circuit for pulsing said emitter,
    d) an electronic circuit for performing signal extraction on the output of said sensor based on the phase of said pulsing, and
    e) an electronic circuit for calculating the distance to said moving object based on a timing of the output of said signal extraction, the geometry of an angular region defined by said electromagnetic radiation that can be sensed by said sensor, and the speed of said moving object.

2. The system of claim 1 wherein said moving object is a moving rotor blade.

3. The system of claim 1 wherein said emitter is a light-emitting diode.

4. The system of claim 1 wherein said emitter is a laser diode.

5. The system of claim 1 wherein said sensor is a photodiode.

6. The system of claim 1 further including at least one optomechanical element that produces a limited field of view for said sensor.

7. The system of claim 6 wherein said optomechanical element is selected from the group consisting of lenses, reflectors, and apertures.

8. The system of claim 1 further including at least one focusing device that increases the intensity of the electromagnetic radiation in at least one region.

9. The system of claim 8 wherein said focusing device is selected from the group consisting of lenses and reflectors.

10. The system of claim 1 further including at least one electromagnetic filter.

11. The system of claim 1 wherein said electromagnetic radiation is infrared radiation.

12. The system of claim 1 further including at least one housing that contains the other elements of said system.

13. A system for measuring timing information to determine the distance to the path of a moving object, comprising:
    a) a first means for emitting electromagnetic radiation,
    b) a second means for sensing said electromagnetic radiation,
    c) a third means for pulsing said emitter,
    d) a fourth means for performing signal extraction on the output of said second means based on the phase of said pulsing, and
    e) a fifth means for calculating the distance to said moving object based on a timing of the output of said signal extraction, the geometry of an angular region defined by said electromagnetic radiation that can be sensed by said second means, and the speed of said moving object.

14. The system of claim 13 wherein said moving object is a moving rotor blade.

15. The system of claim 13 further including a sixth means for limiting the field of view of said second means.

16. The system of claim 13 further including a sixth means for increasing the intensity of the electromagnetic radiation in at least one region.

17. The system of claim 13 further including a sixth means for filtering.

18. The system of claim 13 further including a sixth means for housing the other elements of said system.

19. The system of claim 18 further including a seventh means for isolating said elements from detrimental weather conditions.

20. A method of measuring the distance to the path of a moving object, comprising:
    a) emitting pulses of electromagnetic radiation,
    b) sensing said pulses when they reflect off of said moving object while it passes through at least one field of view,
    c) determining the times at which said moving object enters and exits an angular region defined by said field of view or plurality of fields of view by performing signal extraction based on the phase of the pulsing of said pulses,
    d) calculating the difference between said times, and
    e) calculating said distance to the path of said moving object by comparing said difference with the speed of said moving object and the geometry of said angular region.

21. The method of claim 20 wherein the said moving object is a moving rotor blade, whereby the track height of said rotor blade can be known and adjustments can be performed to said rotor blade to change its track height to a designed value.

22. The method of claim 21 wherein said method is carried out during normal flight operations, whereby dedicated track measurement operations are not required to obtain said track height of said rotor blade.

* * * * *